W. T. Clough,
Concentrating Sulphuric Acid,
No. 15222, Patented July 1, 1856.

Witnesses:
James P. McLean
Ann S. McLean

Inventor:
Wm T Clough

UNITED STATES PATENT OFFICE.

WILLIAM T. CLOUGH, OF NEWARK, NEW JERSEY.

CONCENTRATING APPARATUS FOR SULFURIC ACID.

Specification of Letters Patent No. 15,222, dated July 1, 1856.

*To all whom it may concern:*

Be it known that I, WILLIAM T. CLOUGH, of the city of Newark, in the county of Essex and State of New Jersey, have invented a new and useful Improvement in the Mode of Concentrating Sulfuric Acid by Means of a Furnace Constructed within a Leaden Pan or Tank; and I hereby declare the following to be a full, clear, and exact description of the same, reference being had to the accompanying drawings, which are lettered to correspond with and constitute a part of this specification.

I wish the public to understand that I am not the inventor of a furnace constructed of fire tiles; neither am I the first person, that has concentrated sulfuric acid by the application of open leaden pans; that process has been effectually tried and long since abandoned, in most manufactories; on account of the great waste of the pans themselves, as well as the loss of acid. Platinum stills, or retorts, are the best apparatus for concentrating acids; but, on account of their great expense, and the constant care necessary to keep them in order, I have been induced to adopt the following method of constructing a furnace for that purpose that meets my most sanguine expectations in every respect.

Figure 1:
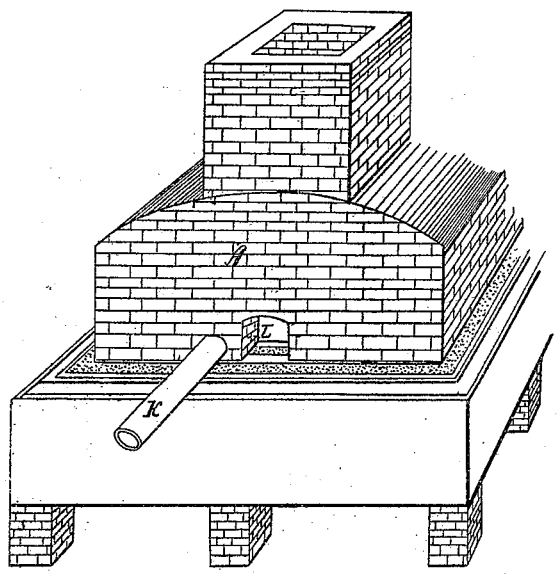

The nature of my improvement consists in the construction of a furnace (A) Figure 1, within a leaden pan, or tank, in such a manner that the acid will not act upon, or dissolve the lead, during the process of evaporating the water from the sulfuric acid.

The bed or cistern proper Figs. (2, and 3,) that contains the acid to be concentrated is constructed of fire tiles, or other, material not acted upon, or (dissolved) by hot sulfuric acid. Next to the cistern (*a*,) I place a strata of sand (*b*,) then another strata of fire tiles (*c*,) next a strata of sand, (*d*,) then a lead or mineral pan, or tank, (*e*,) which stands in a water chamber, or tank, (*f*,) that should be kept full of water, though the furnace may be operated without the application of the water (G.) By the nonconducting property of the fire tiles in combination with the sand or its equivalent, not soluble by the action of hot sulfuric acid, I am enabled to preserve uninjured the leaden pan, or tank.

The object of the leaden pan is to prevent the acid from escaping, as the joints of the tiles are not liquid tight, and the sand is porous. The tiles, and sand, become saturated on first filling the furnace with acid, and no further loss takes place. Lead is dissolved by hot sulfuric acid but not by cold; hence it is better adapted for such purpose to prevent leakage; although the acid is at a high temperature inside the furnace, it becomes cold or nearly so before reaching the lead, after passing through the tiles, and sand. The pottery is made simply to overlap as shown in the drawings, without any cement in the joints and carefully placed upon the sand.

Figure 3:
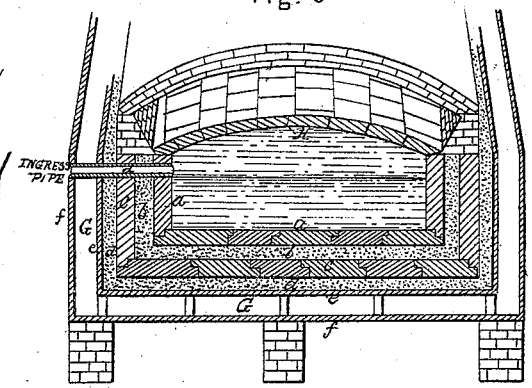

The concentrating arch (or radiator) (H) forms the top of the bed of the furnace, and its abutments are the sides of the said bed. Hence I have isolated the bed (or cistern proper) (*a*,) from the direct heat of the fire (I,) thus forming an air tight muffle, or oven; into which I place the sulfuric acid by means of the ingress pipe (*d*, Fig. 3) when opened to replenish the charge.

Letter (K,) is an escape pipe, and is used to convey away the water and gaseous particles, as rapidly as they are evaporated. The escape pipe (K) connects with the smoke stack by the agency of which the vapors generated are expelled.

Figure 2:
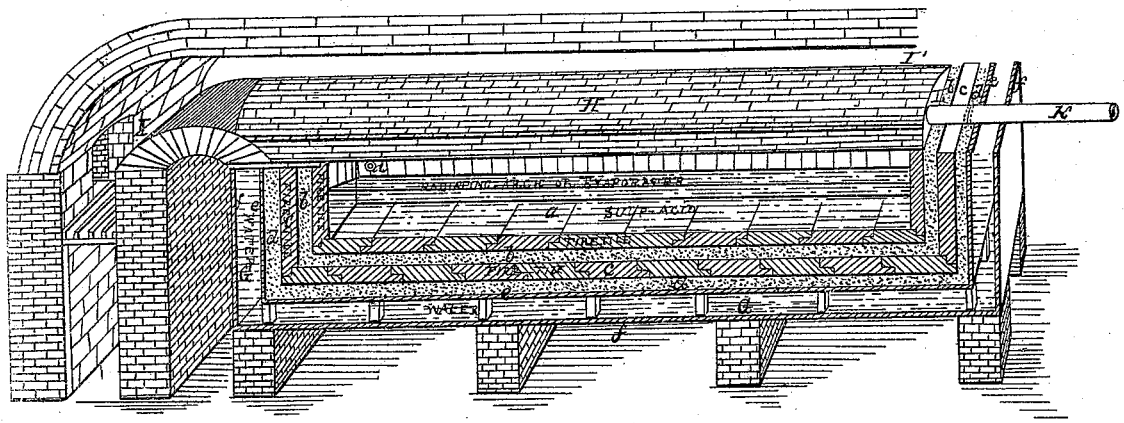

Letter (L,) Figs. 1, and 2, is an opening to the interior or concentrating bed, for the purpose of cleansing, or repairing.

There is another arch immediately over, and running along with, the radiator (H,) and the space between them forms the fire flue (I',). This opening or flue is 12 inches more or less in height and it extends over the whole upper surface of the radiating arch (H,) which soon becomes heated to a high temperature. The arches are composed of common fire tiles, metallic plates may be used if kept constantly hot. The heat from the under side of the concentrating arch (H) evaporates the watery particles from the sulfuric acid (by the action of the radiated heat upon the upper surface of the liquid,) thus concentrating the acid to the required strength, which is 66° Baumé. The fire is then withdrawn, and the concentrated sulfuric acid drawn off and bottled; the furnace is then ready for another charge of weak acid.

I purpose so arranging the furnaces, that one may feed a neighboring furnace, simply by having the feeder upon a higher level, and using the siphon which process is well known to those skilled in the manufacture of concentrated sulfuric acid; the process may be continuous that is, weak acid running into the higher furnace, and concentrated acid discharging itself from the lower furnace.

I am aware that leaden pans have been used with covers of the same material having the direct heat from the fire to pass under them, but the pans and covers soon become destroyed and unfit for use; arches have been used for decomposing salt arranged similar to my radiating and fire arches, but, the combination of a furnace constructed after the above plan for the purpose of concentrating sulfuric acid, until it is entirely evaporated if required, I believe to be new, novel, and useful.

Therefore what I claim as my invention, and wish to secure by Letters Patent, of the United States, is—

The construction of a furnace so that the sulfuric acid will not effect, or injure, the lead, or mineral tank, or pan, during the process of concentration; by means of a hot surface being placed above the liquor, substatially as described in the above specification.

W. T. CLOUGH.

Witnesses:
Z. A. HITCHCOCK,
JAMES P. McLEAN.